United States Patent [19]
Lu

[11] Patent Number: 5,835,542
[45] Date of Patent: Nov. 10, 1998

[54] DIGITAL DATA SEPARATOR FOR SEPARATING DATA SIGNALS FROM CLOCK SIGNALS IN AN ENCODED DATA STREAM

[75] Inventor: Chau-Her Lu, Tainan, Taiwan

[73] Assignee: Utek Semiconductor Corporation, Hsinchu, Taiwan

[21] Appl. No.: 683,932

[22] Filed: Jul. 19, 1996

[51] Int. Cl.$^6$ ..................................... H04L 7/02
[52] U.S. Cl. ..................... 375/359; 375/359; 375/340; 360/51; 369/124
[58] Field of Search ............... 375/340, 367, 375/210, 259, 371, 364, 555, 825; 360/51, 48, 72.1; 369/124

[56] References Cited

U.S. PATENT DOCUMENTS

| 553,100 | 9/1896 | Saban et al. | 375/340 |
|---|---|---|---|
| 4,996,608 | 2/1991 | Widney | 360/51 |
| 5,235,590 | 8/1993 | Taguchi et al. | 369/124 |
| 5,598,443 | 1/1997 | Poeppleman | 375/359 |

*Primary Examiner*—Stephen Chin
*Assistant Examiner*—Shuwang Lin
*Attorney, Agent, or Firm*—W. Wayne Liauh

[57] ABSTRACT

A digital data separator for separating data signals from clock signals contained in an encoded data stream in alternating data/clock slots without requiring a phase-locked loop. The digital data separator comprises: (a) a system clock source for generating system clock pulses; (b) an up-counter coupled to the system clock source for incrementing a system clock count, the up-counter is structured such that the system clock count is incremented by the system clock pulses and is reset to zero upon receiving a reset signal; (c) a state generator containing an edge detector for detecting an edge transition in an input signal within a predetermined range of system clock counts, and a combination logic for generating a data control signal, a reference clock control signal, and the reset signal when such edge transition in the input signal is detected within the predetermined range of system clock counts or when the system clock counts reaches a predetermined value; and (d) a window and data generator for generating regenerated clock and data signals in response to the data control signal and the reference clock control signal received from the state generator.

18 Claims, 8 Drawing Sheets

DIGITAL DATA SEPARATOR FOR SEPARATING DATA SIGNALS FROM CLOCK SIGNALS IN AN ENCODED DATA STREAM

FIELD OF THE INVENTION

The present invention relates to a digital data separator. More specifically, the present invention relates to an improved digital data separator for separating data signals from an encoded data stream that contains clock and data signals in alternating clock/data slots.

BACKGROUND OF THE INVENTION

Digital data is typically stored on a floppy disk according to a format by which both clock and data information is encoded in alternating data and clock slots in a common data stream. According to this format, the clock signals appear regularly at predetermined spaced intervals, or the so-called "clock slots". The space between two adjacent clock slots is defined as a data window. The binary data signals, which are in the form of logic "1" and "0" signals, appear at the middle of the data window (the "data slots"). A "1" signal is conventionally defined by the presence of a pulse in the data window, and a "0" signal is conventionally defined by the absence of a pulse in the data window. In order to utilize the data contained in the common data stream encoded in this manner, a data separator is required to separate the data signals from the clock signals, so that the data signals can be subsequently used by a computer or microprocessor via an interface device such as a disk controller.

Ideally, the data pulses in the data/clock data stream should occur at, or as near as possible to, the middle of the data window. However, as a result of variations or fluctuations in the speed of the motor that drives the floppy disk, or other magnetic effects, deviations in the position of the data pulse may occur, resulting in incorrect data signals being read from the floppy disk data source. In addition to the phase shift, there are also noise and jitters that typically exist in the data stream from a floppy disk data source. Thus, the data separator must also be able to eliminate the noise in the data stream and rectify any possible phase shift.

Several techniques have been taught in the art for separating data pulses from the clock pulses. One known technique involved the use of an analog phase-locked loop, which employed a phase detector and a voltage-controlled oscillator to determine the data and clock slots from the serial data stream. Another known technique involved the use of a monostable multivitrator to distinguish the clock pulses from the data pulses in the serial data/clock pulse stream. These techniques have been considered largely inadequate for the high density floppy disks that are used essentially ubiquitously today.

In U.S. Pat. No. 4,472,818 (the '818 patent), the content thereof is incorporated by reference, it is disclosed a data separator, in which a derived clock pulse is produced by a synthetic oscillator phase-locked loop. The relative phase of the derived clock is adjusted or corrected in response to the sensed phase of an input data stream to tend to position the data pulse toward the center of its half-bit slot (i.e., the data window). The detection of an input data away from the center of the half-bit slot causes an adjustment of the phase of the synthetic oscillator, such that the center of the half-bit slots defined therein is brought closer to the input pulse.

In U.S. Pat. No. 4,796,280 (the '280 patent), the content thereof is incorporated by reference, it is disclosed a digital data separator which utilizes a digital phase locked-loop to develop a period value for a reference clock that is incrementally modified in accordance with new input data so as to position a regenerated data pulse in the middle of the data window, or half-bit cell. The digital phase-locked loop disclosed in the '280 patent includes a zero-crossing oscillator, which includes an up-down counter that is incremented by an internal clock until its output is equal to the normal period of the half-bit cell. The digital phase-locked loop further includes a normal period adjuster and a digital low-pass filter to remodel the time-weighted pervious period data.

The digital separators taught in the '818 and '280 patents provided substantial improvements over their precursors/counterparts. However, because these devices require either a digital phase-locked loop or a synthetic oscillator based phase-locked loop, they do not satisfy today's minimum-cost requirement that has been accustomed to and often demanded by today's PC consumers. Thus, it is desirable to design and develop alternative data separators which could offer equal or improved performance, but without the digital phase-locked loop, so that they can be provided at a substantially lowered cost.

SUMMARY OF THE INVENTION

The primary object of the present invention is to develop an improved data separator which allows data signals to be correctly separated from clock signals in an alternating clock/data encoded data stream. More specifically, the primary object of the present invention is to develop an improved data separator, which can overcome the noise, jitters, and phase shifts that commonly exist in the data stream from a floppy disk, so as to allow data signals to be correctly separated from clock signals in an alternating clock/data encoded data stream, without requiring a digital phase-locked loop so as to lower the production cost.

FIG. 1 shows a common format for storing data on a floppy disk according to which data signals and clock signals are encoded in alternating clock/data slots. As shown in FIG. 1, the clock signals appear regularly at predetermined spaced intervals, or at the so-called "clock slots". The space between too adjacent clock slots is defined as a "data window" (data slots). The binary data signals, which are in the form of logic "1" and "0" signals, appear at the center of the data window. A "1" signal is conventionally defined by the presence of a pulse in the data window, and a "0" signal is conventionally defined by the absence of a pulse in the data window. Typically, as a result of phase shifts, which occur due to variations or fluctuations in the speed of the motor that drives the floppy disk or other magnetic effects, and other noise and jitters that typically exist in the data stream from a floppy disk, the data pulses in the data/clock data stream may not occur at the intended locations. These result in data being missed, or incorrect data being read, from the data stream. In order to utilize the data contained in the common data stream, a data separator is required to correctly separate the data signals from the clock signals, so that the data signals can be subsequently used by a computer or microprocessor via an interface device such as a disk controller.

FIG. 2 is a schematic diagram of a prior art digital data separator 200 utilizing a phase-locked loop. FIG. 2 shows that the input signal (containing both clock and data signals) and the system clock pulses are fed into a phase-locked loop 201. The synchronized output from the phase-locked loop 201 as well as the input signal and the system clock pulses are then input to a data regenerator 202, from which a regenerated window signal (designated as RDW) and a regenerated data signal (designated as RDD) are output. The regenerated window signal RDW and the regenerated data signal RDD are synchronized, and both signals are output to an external device, such as a disk controller, where the data phases are separated from the clock phases so that they can be utilized by a data processing unit, such as a microprocessor, for further processing.

The phase-locked loops employed in the conventional data separators can be either analog or digital. As discussed heretofore, the analog-phase-locked-loop-based data separators do not provide the desired performance for high density floppy disks. The digital-phase-locked-loop-based data separators, on the other hand, provide improved performance, but they are generally too complicated and are relatively expensive to suit for today's low-cost environment.

The digital data separator disclosed according to a preferred embodiment of the present invention comprises:

(a) a system clock source for generating system clock pulses;

(b) a state generator, or state machine, which detects an edge transition in an input signal within a predetermined system clock period, and generates a data control signal and a reference clock control signal at the beginning of each system clock period;

(c) an up-counter coupled to the system clock source, the up-counter is structured such that its count is incremented by the system clock pulses until the count equals a predetermined period and is reset by a reset signal generated by the state generator; and (d) a window and data generator for generating separated clock and data signals in response to the data control signal and the reference clock control signal.

One of the key elements of the digital data separator disclosed in the present invention is that it does not require a phase-locked loop to achieve the desired results. In the present invention, the state generator includes a register, and an edge detector means for detecting a positive edge transition in the input signal, and means for generating an input edge signal when the positive edge transition is detected. The state generator also includes a combination logic, which receives the input edge signal and generates the data control signal and the reference clock signal as outputs. To eliminate noise and simplify operation, the state generator of the present invention identifies the edge transition only when the count in the up-counter reaches a predetermined value, which is typically a number slightly less than the number of system clock pulses required to fill the distance between the clock slot and the data slot under normal conditions.

BRIEF DESCRIPTION OF THE DRAWINGS

The present invention will be described in detail with reference to the drawings showing the preferred embodiment of the present invention, wherein.

DETAILED DESCRIPTION OF THE PREFERRED EMBODIMENT

Figure 1:
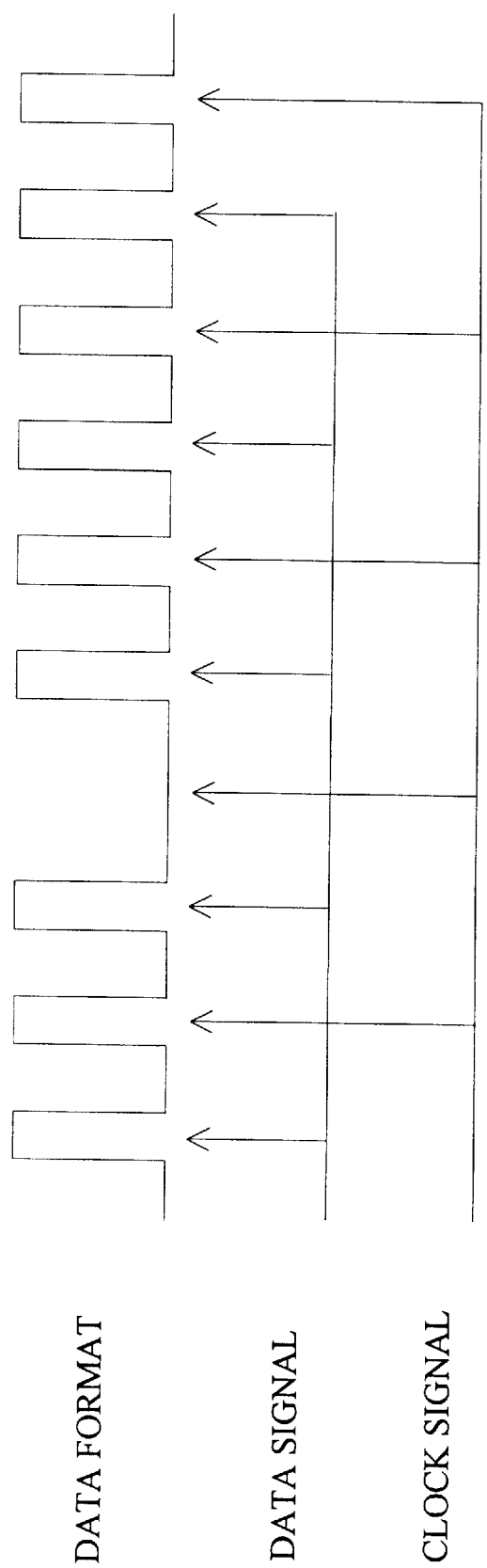
FIG. 1 is a schematic diagram showing a common format for storing data on a floppy disk according to which data signals and clock signals are encoded in an alternating clock/data manner.

The present invention discloses an improved data separator for correctly separating data signals from clock signals encoded in alternating clock/data slots in a data stream typically seen from a floppy disk data source. One of the key elements of the digital data separator disclosed in the present invention is that it does not require a phase-locked loop, which is typically required in all the prior art data separators, to achieve the desired results. The phase-locked loops employed in the conventional data separators are either functionally unsatisfactory, or are relative too expensive to satisfy today's consumer demand.

The digital data separator disclosed in the present invention comprises: (a) a system clock source for generating system clock pulses; (b) a state generator, or state machine, which detects an edge transition in an input signal within a predetermined range of system clock counts, and generates a data control signal and a reference clock control signal when such edge transition in the input signal is detected within the predetermined range of system clock counts; (c) an up-counter coupled to the system clock source, the up-counter is structured such that its count is incremented by the system clock pulses until it is reset by a reset signal generated by the state generator; and (d) a window and data generator for generating separated clock and data signals in response to the data control signal and the reference clock control signal received from the state generator. The state generator includes a register for outputting the state signal, an edge detector means for detecting a positive edge transition in the input signal, and means for generating an input edge signal when the positive edge transition is detected. The state generator also includes a combination logic, which receives the input edge signal and state signal as inputs, and generates the data control signal and the reference clock signal as outputs. To eliminate noise and simplify operations, the state generator of the present invention begins to identify the edge transition only when the count in the up-counter reaches a predetermined value, which is typically a number that is slightly small than the number of system clock pulses required to fill the distance between the original clock pulse and the data pulse under a normal condition. Because the absence of pulse in the data slot could also indicate a data signal (i.e., a "0" signal), the state generator of the present invention will not stop identifying the edge transition until after the count in the up-counter reaches another predetermined value, which is typically an integer that is slightly greater than the number of system clock pulses between a normal data slot and a normal clock slot. In a preferred embodiment, the number of system clock pulses between a normal data slot and a normal clock slot is set to be 16, the first predetermined count is 13, and the second predetermined count is 17. This range of counts can be adjusted if it is appropriate or if the condition dictates.

Now referring to the drawings, FIG. 1 shows the typical format for storing data on a floppy disk according to alter data signals and clock signals are encoded in spaced slots arranged in an alternating clock/data manner. Under ideal situations, the clock signals appear regularly at predetermined spaced intervals, or "clock slots". The space between two adjacent clock slots is defined as a "data window". The binary data signals, which are in the form of logic "1" and "0" signals, appear at the middle of the data window (data slots). The presence of a pulse in the data window indicates a "1" signal, and the absence of a pulse in the data window indicates a "0" signal.

Figure 2:
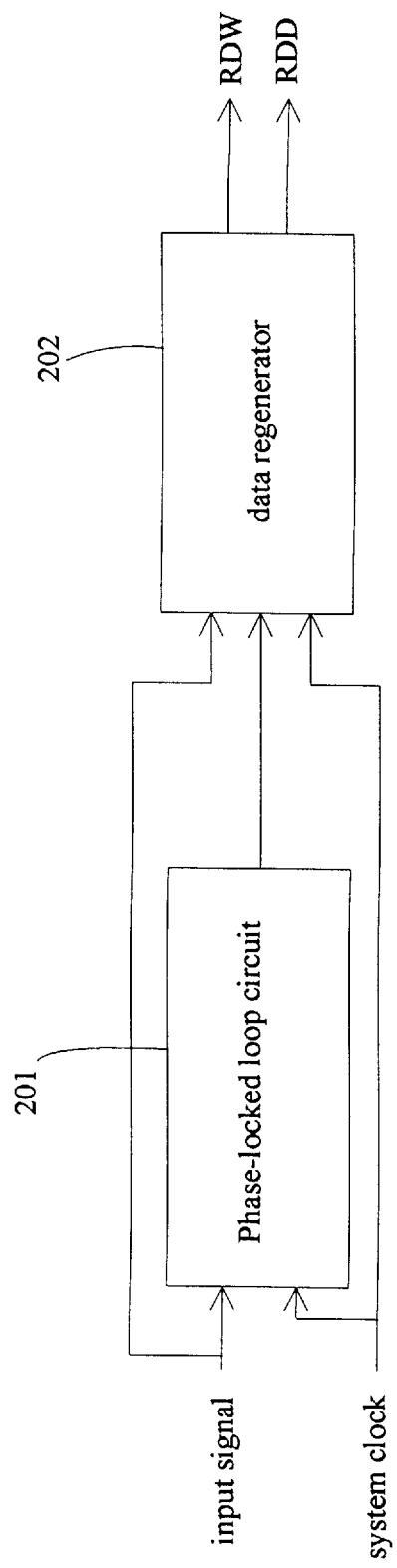
FIG. 2 is a schematic block diagram of a prior art digital data separator utilizing a phase-locked loop, which can be either analog or digital.

FIG. 2 is a schematic diagram of a prior art digital data separator 200 utilizing a phase-locked loop. The input signal, which contains both clock and data signals, and pulses from the system clock are fed into a phase-locked loop 201. Outputs from the phase-locked loop 201, along with the input signal and the system clock, are then input to a data regenerator 202, from which a regenerated window signal (designated as RDW) and a regenerated data signal (designated as RDD) are generated. The synchronized regenerated window signal RDW and the regenerated data signal RDD are output to an external device, such as a disk controller, which separates the data phases from the clock phases so that the data signals can be utilized by a data processing unit, such as a microprocessor, for further processing.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

Figure 3:
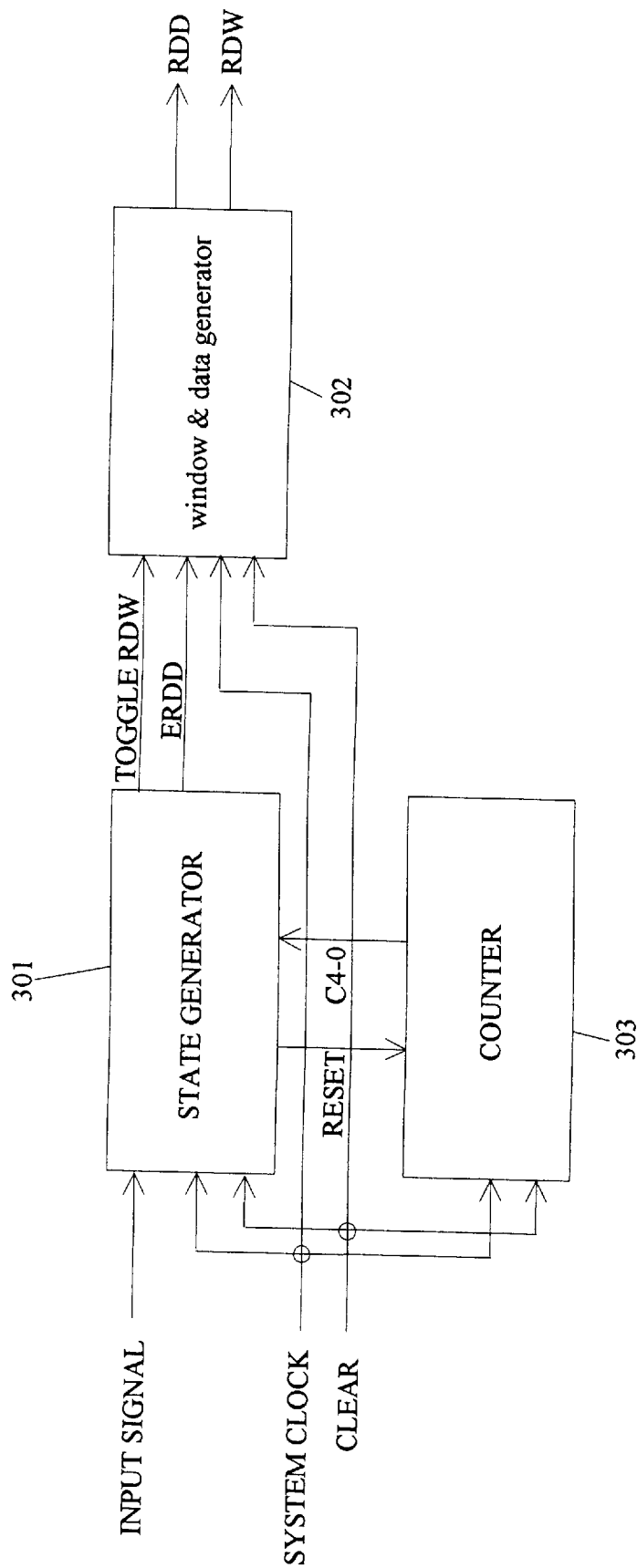
FIG. 3 is a schematic block diagram showing the main components of a digital data separator according to a preferred embodiment of the present invention.

FIG. 3 is a schematic block diagram showing the main components of a digital data separator according to a preferred embodiment of the present invention. The digital data separator 300 of the present invention comprises a state generator (which is sometimes called a "state machine") 301, a window and data generator 302, and an up-counter 303. The state generator 301 receives an encoded data stream from a data source and system clock pulses from a system clock source. In a preferred embodiment, the up-counter is a 5-bit counter, outputting a counter value $C_{4\sim 0}$. The state generator 301 is designated to output, among other things, 6-bit state signals, from "100000" (State__1) to "000001" (State__6), as well as Toggle__RDW (reference clock control signal) and ERDD (data control signal) signals. The up-counter 303 is reset to 0 when a Reset signal is received from the state generator 301. The window and data generator 302 receives the Toggle__RDW and ERDD signals from the state generator, and outputs RDW and RDD signals in accordance therewith. The RDW and RDD signals are subsequently utilized to derive separated data and clock signals. This will be illustrated in FIG. 8.

Figure 4:
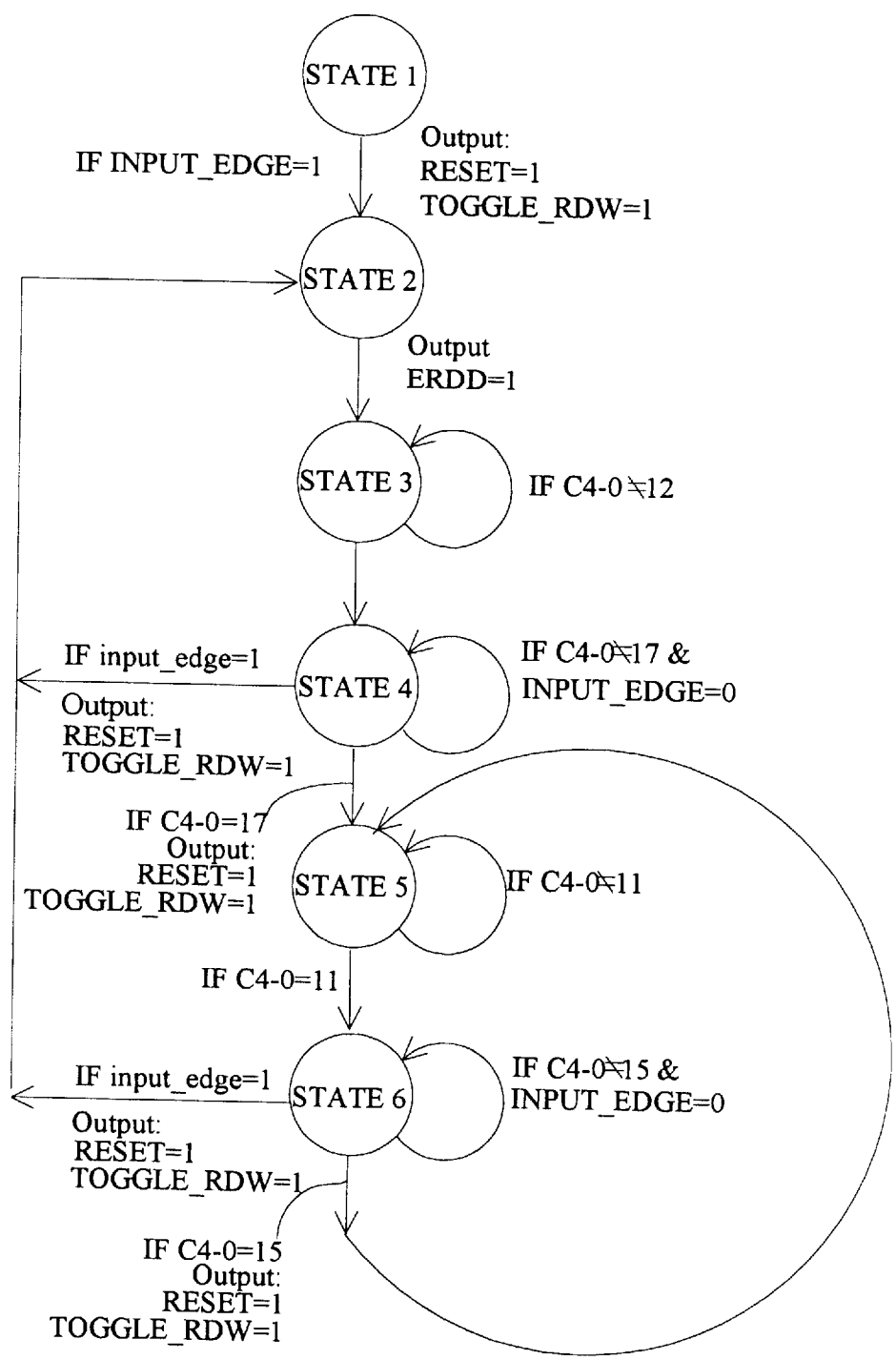
FIG. 4 is a state diagram illustrating the various states generated by a state generator according to a preferred embodiment of the present invention.
Figure 5:
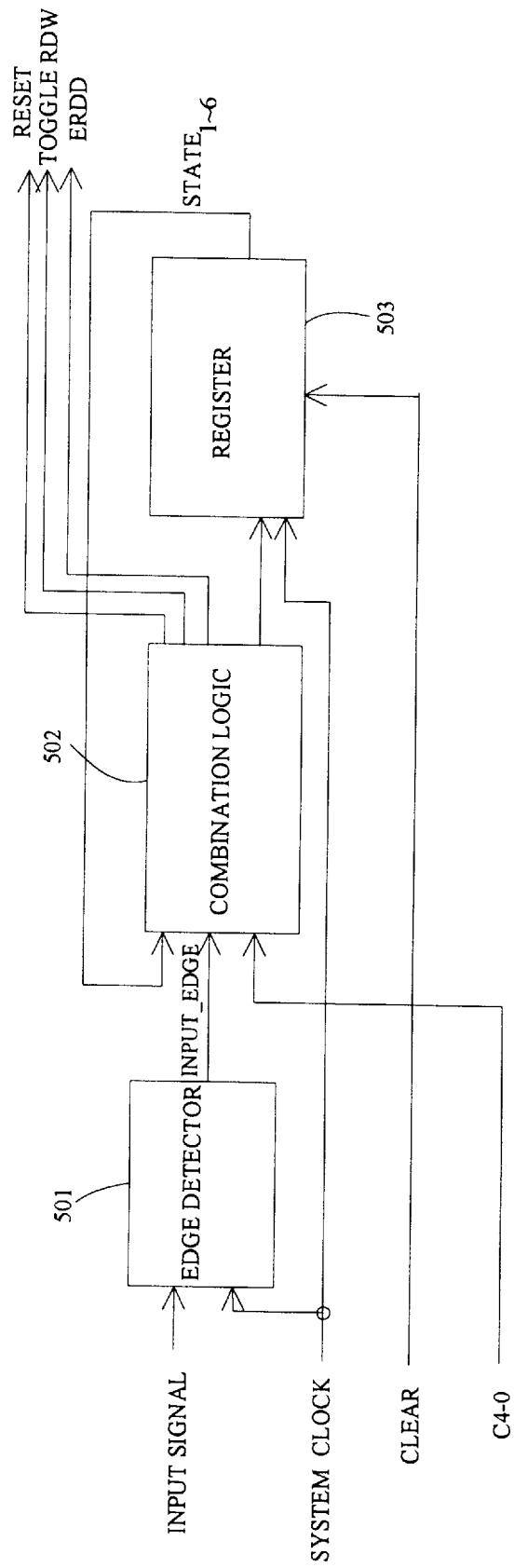
FIG. 5 is a schematic block diagram of the state generator shown in FIGS. 3 and 4 according to a preferred embodiment of the present invention.

FIG. 4 is a state diagram illustrating the operations in the various states generated by a state generator according to a preferred embodiment of the present invention. And FIG. 5 is a schematic block diagram of the state generator shown in FIG. 3 according to a preferred embodiment of the present invention. FIG. 5 shows that the state generator 301 comprises an edge detector 501, a combination logic 502, and a register 503. The system clock source provides clock signals, or pulses, for the entire system. FIGS. 3–5 also show the inclusion of a "Clear" signal (shown as reset=1), which is utilized to reset the entire system to its initial state. In a preferred embodiment of the present invention, the system clock is designed to have a frequency 16 times the frequency of the input signal (i.e., there will be 32 system clock cycles between two input clock pulses under normal conditions, or 16 system clock cycles between the center of an input slot and the center of a data slot under normal conditions). Typically, a system clock at 12~16 times the frequency of the input signal should suffice.

Figure 6:
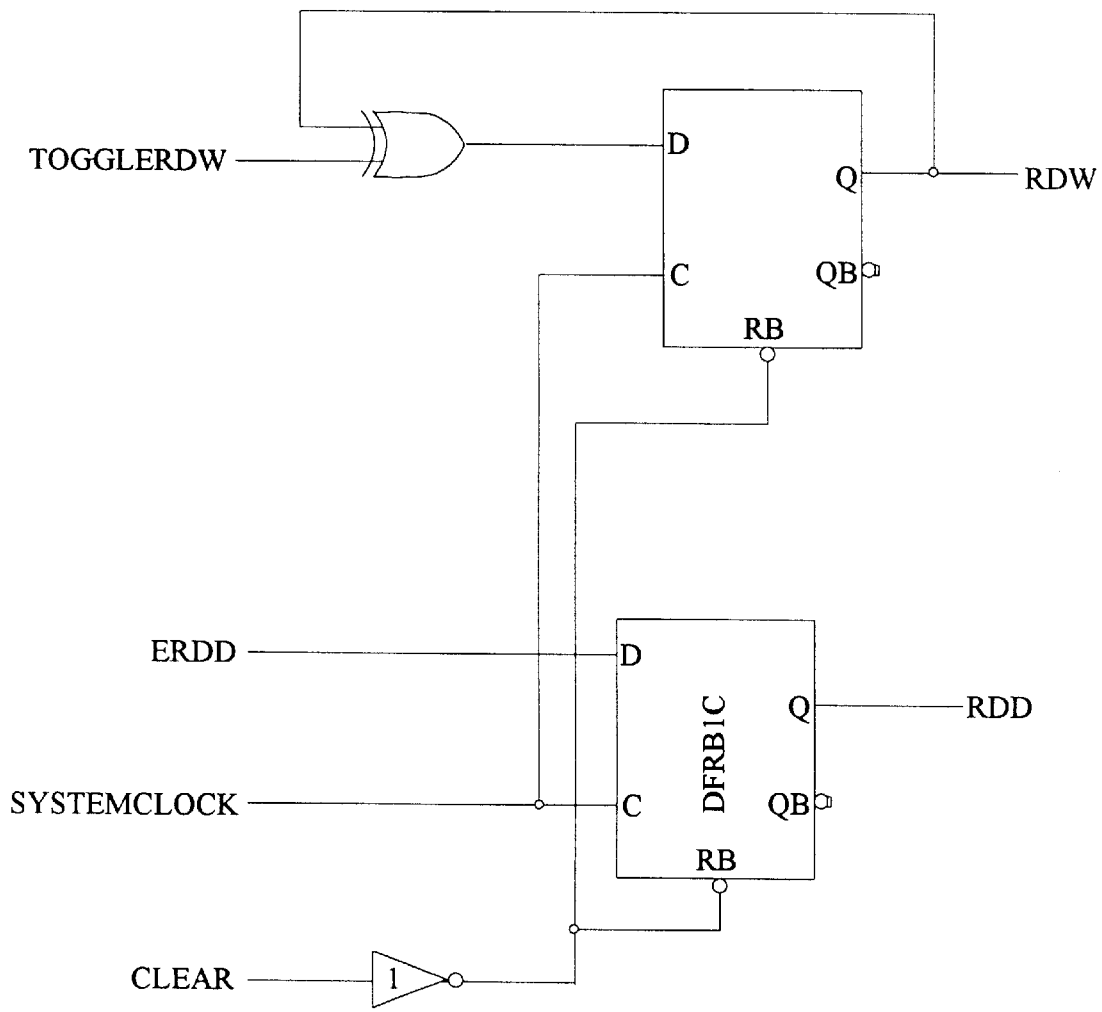
FIG. 6 is a schematic block diagram of the window and data generator shown in FIG. 3 according to a preferred embodiment of the present invention.
Figure 7:
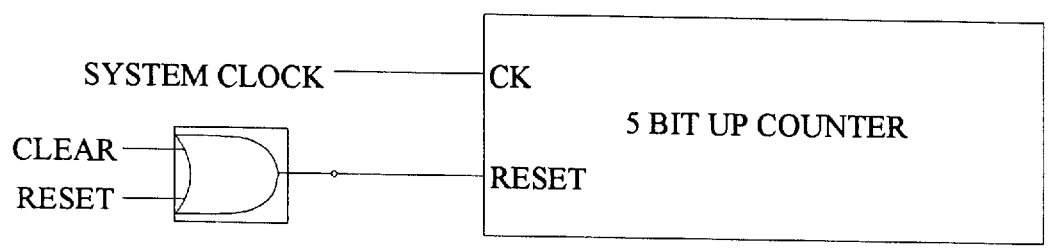
FIG. 7 is a schematic block diagram of the up-counter shown in FIG. 3 according to a preferred embodiment of the present invention.

FIG. 6 is a schematic block diagram of the window and data generator shown in FIG. 3 according to a preferred embodiment of the present invention. FIG. 7 is a schematic block diagram of the up-counter shown in FIG. 3 according to a preferred embodiment of the present invention. These constructions only represent preferred embodiments, other designs are possible to achieve the intended purposes.

Now referring to FIGS. 4 and 5, together, when the edge detector 501 of the state generator 301 detects a positive edge transition in the input data signal, the Input$_{13}$ Edge output from the edge detector 501 is set to 1. The output Input__Edge is fed to combination logic 502. At this time, the state in the state generator 301 is moved from State__1 to State__2, the register 503 outputs a State$_{1\sim 6}$ signal of "010000"(State__2), and the combination logic, which responds to the State$_{1\sim 6}$ signal received from the register 503, resets both Toggle__RDW and Reset signals to 1. Resetting Toggle$_{13}$ RDW to 1 causes the window and data generator 302 to toggle the RDW signal, and resetting the Reset signals to 1 clears the up-counter 303 to 0.

The state in the state generator 301 now moves from State__2 to State__3. At this time, register 503 outputs a State$_{1\sim 6}$ signal of "001000" (State__3), which causes the combination logic to output ERDD=1 The ERDD signal is received by data and window generator 302. When ERDD= 1, the data and window generator 302 will set RDD=1, indicating the detection of a positive edge transition in the input signal.

FIG. 4 shows that, during State__3, the up-counter 303 is examined to see if the counter value $C_{4\sim 0}$ reaches 12, i.e., "01100" in binary form. When this occurs, i.e., the counter value $C_{4\sim 0}$ equals 12, the state generator 301 will move into State__4 and register 503 will output a State$_{1\sim 6}$ signal of "000100" (State__4) to initiate the process for detecting the next edge transition in the input signal. Otherwise, the up-counter 303 will continue to increment until the counter value $C_{4\sim 0}$ reaches 12.

When a positive edge transition is detected in the input signal during State__4, the state generator 301 will return to State__2, to start another edge detection process. At the same time, the register 503 outputs a State$_{1\sim 6}$ signal of "010000", and the combination logic resets both Toggle__RDW and Reset signals to 1. Again, resetting Toggle__RDW to 1 causes the window and data generator 302 to toggle the RDW signal, and resetting the Reset signals to 1 causes the counter value $C_{4\sim 0}$ to "00000".

On the other hand, if no positive edge transition is detected in the input signal during State__4 when the counter value $C_{4\sim 0}$ reaches 17, the state generator 301 will move to State__5 (i.e., the register 503 will output a State$_{1\sim 6}$ signal of "000010"), and the combination logic will reset both Toggle__RDW and Reset signals to 1, to start a new edge detection process within State__5.

Ideally, if a data pulse is contained in the input data stream, a positive edge transition should be expected to be detected when counter value, $C_{4\sim0}$, reads 15 or 16. However, due to various magnetic effects on the floppy disk and/or variations or fluctuations in the speed of the motor that drives the floppy disk, the position at which the data pulse occurs may change, such that the data pulse may occur either before the counter value reaches 15 or after it reaches 16. To accommodate this possible phase shift, in the preferred embodiment of the present invention as described above, the threshold up-counter values in State_3 and State_4 were set to 13 and 17, respectively. With this implementation, any positive edge transition in the input signal between (and including) $C_{4\sim0}=13$ and $C_{4\sim0}=17$ will be correctly identified by the state generator 301. If the operation conditions dictate, the threshold up-counter values can be adjusted so that the interval (i.e., the range of system clock counts) in which the positive edge detection is made is set to other ranges than between 13 and 17. For example, this range may be narrowed to help eliminate noises in the input signal, as any positive edge transition falling outside this predetermined range will be ignored.

The state generator 301 will move to State_5 (i.e., the register 503 will output a $State_{1\sim6}$ signal of "000010"), if no positive edge transition is detected in the input signal during $State_{13}$ 4 after the counter value $C_{4\sim0}$ reaches 17. The move from State_4 to State_5 indicates that a "0" signal is detected in the data pulse (i.e., a lack of a positive data pulse). The operations in State5 and State_6 are similar to those in State_3 and State_4, respectively, except that, since State_4 takes up two extra system clocks (from 15 to 17), the threshold counter values of system clocks in State_5 and State_6 are reduced to 11 and 15, respectively (as opposed to 13 and 17, in State_3 and State_4, respectively). FIG. 4 shows that, if any positive edge transition is detected in the input signal before counter value $C_{4\sim0}$ reaches 15, the state generator 301 will be moved back to State_2, and the register 503 will correspondingly output a $State_{1\sim6}$ signal of "010000". Along with the change in state, Toggle_RDW and Reset signals are set to 1. This reset signal set up-counter to 0, and the Toggle_RDW signal causes the data and window regenerator 302 to toggle the RDW output. FIG. 4 shows that the state generator will remain in State_5 and State_6 until a positive edge transition is detected by the edge detector 501 within appropriate ranges of system clock counts.

The above described state transitions continue until a Clear signal is received by the state generator 301. When this occurs, the system returns to its initial state (i.e., State_1), and the processing of the input signal is stopped.

Figure 8:
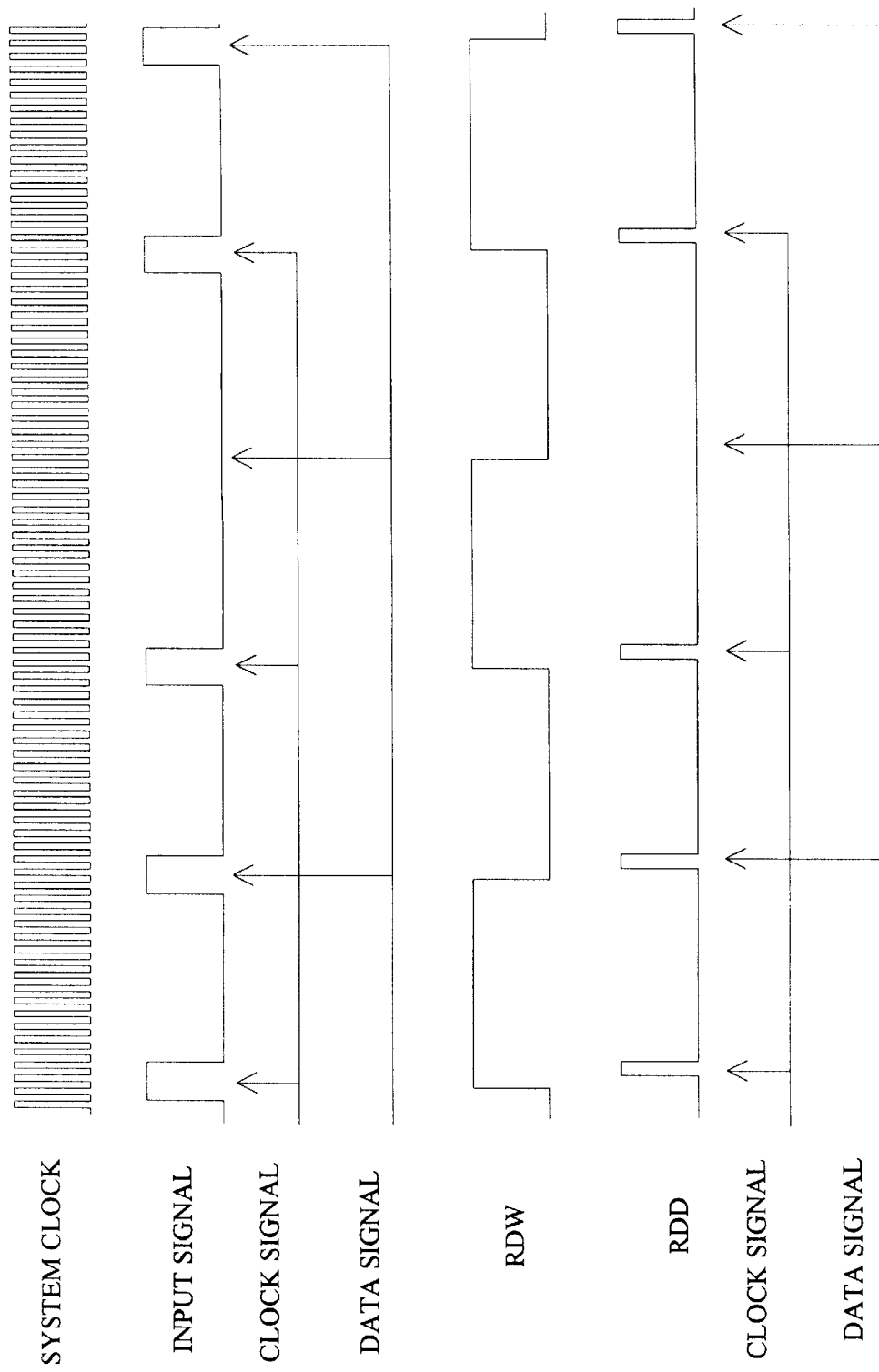
FIG. 8 is an illustrative waveform diagram of RDW (regenerated window signal) and RDD (regenerated data signal) generated by the digital data separator shown in FIG. 3.

FIG. 8 is an illustrative waveform diagram of RDW (regenerated window signal) and RDD (regenerated data signal) generated by the digital data separator shown in FIG. 3. FIG. 8 shows that when RDW is logically high, an RDD pulse indicates that a clock pulse is present in the input data stream. On the other hand, when RDW is logically low, an RDD pulse indicates that a data pulse (either a positive data pulse "1" or a zero data pulse "0") is present in the input data stream. The RDD and RDW signals are sent to a disk controller where the data signals can be accurately and conveniently separated from the clock signals.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A digital data separator for separating data signals from clock signals contained in an encoded data stream in alternating data/clock slots, comprising:

(a) a system clock source for providing system clock pulses;

(b) an up-counter coupled to said system clock source for incrementing a system clock count, said up-counter is structured such that said system clock count is incremented by the system clock pulses and is reset to zero upon receiving a reset signal;

(c) a state generator containing means for detecting an edge transition in an input signal within a predetermined range of system clock counts, and means for generate a data control signal, a reference clock control signal, and said reset signal when such edge transition in the input signal is detected within said predetermined range of system clock counts or when said system clock counts reaches a predetermined value; and (d) a window and data generator for generating regenerated clock and data signals in response to said data control signal and said reference clock control signal received from said state generator;

(e) further wherein said state generator comprises:

(i) a first state means for moving said state generator from a first state to a second state upon the detection of a positive edge transition in said input signal;

(ii) a second state means for moving said state generator from said second state to a third state and issuing a positive reference clock control signal, when said positive edge transition is detected in said input signal;

(iii) a third state means for issuing a command to examine said system clock counts and moving said state generator from said third state to a fourth state, when said system clock count reaches a first predetermined value;

(iv) a fourth state means for:

(A) issuing a command to examine said system clock counts until said system clock count reaches a second predetermined value;

(B) moving said state generator from said fourth state to said second state and outputing a positive reset signal and a positive data control signal, when a positive edge transition is detected in said input signal;

(C) moving said state generator from said fourth state to a fifth state and outputing a positive reset signal and a positive data control signal, when said system clock count reaches said second predetermined value;

(v) a fifth state means for issuing a command to examine said system clock counts and moving said state generator from said fifth state to a sixth state, when said system clock count reaches a third predetermined value; and (vi) a sixth state means for:

(A) issuing a command to examine said system clock counts until said system clock count reaches a fourth predetermined value;

(B) moving said state generator from said sixth state to said second state and outputting a positive reset signal and a positive data control signal, when a positive edge transition is detected in said input signal;

(C) moving said state generator from said sixth state to a fifth state and outputting a positive reset signal and a positive data control signal, when said system clock count reaches said fourth predetermined value.

2. A digital data separator according to claim 1 wherein said state generator comprises:

(a) an edge detector means for detecting a positive edge transition in said input signal;

(b) an input edge signal generating means for generating an input edge signal when said positive edge transition is detected; and (c) a register for outputting a state signal of said state generator.

3. A digital data separator according to claim 2 wherein said state generator further comprises a combination logic, which receives said input edge signal and said system clock count as inputs, and generates said data control signal and said reference clock signal as outputs.

4. A digital data separator according to claim 1 wherein said system clock source has a frequency which is an integer multiple of the frequency of said input signal.

5. A digital data separator according to claim 4 wherein said system clock source has a frequency which is sixteen times the frequency of said input signal.

6. A digital data separator according to claim 4 wherein said system clock source has a frequency which is between twelve and sixteen times the frequency of said input signal.

7. A digital data separator according to claim 1 wherein:

(a) said system clock source has a frequency which is a first integer multiple of the frequency of said input signal;

(b) said first predetermined value is said first integer minus one minus a second integer; and (c) said second predetermined value is said first integer minus one plus said second integer.

8. A digital data separator according to claim 7 wherein:

(a) said third predetermined value is said first integer minus one minus twice of said second integer; and (b) said fourth predetermined value is said first integer minus one.

9. A digital data separator according to claim 1 which does not contain a phase-locked loop.

10. A digital data separator for separating data signals from clock signals contained in an encoded data stream in alternating data/clock slots, comprising:

(a) a system clock source for providing system clock pulses;

(b) an up-counter coupled to said system clock source for incrementing a system clock count, said up-counter is structured such that said system clock count is incremented by the system clock pulses and is reset to zero upon receiving a reset signal;

(c) a state generator containing means for detecting an edge transition in an input signal within a predetermined range of system clock counts, and means for generate a data control signal, a reference clock control signal, and said reset signal when such edge transition in the input signal is detected within said predetermined range of system clock counts or when said system clock counts reaches a predetermined value; and (d) a window and data generator for generating regenerated clock and data signals in response to said data control signal and said reference clock control signal received from said state generator;

(e) wherein said regenerated clock and data signals are encoded such that:

(i) when said regenerated clock signal is logically high, a presence of a regenerated data pulse indicates that a clock pulse is present in said regenerated data stream; and (ii) when said regenerated clock signal is logically low, a presence of a regenerated data pulse indicates that a data pulse is present in said regenerated data stream.

11. A floppy disk controller comprising:

(a) a digital data separator for reformatting input data signals received from a floppy disk, said input data signals containing data signals and clock signals arranged in alternating data/clock slots, said digital data separator comprising:

(i) a system clock source for providing system clock pulses;

(ii) an up-counter coupled to said system clock source for incrementing a system clock count, said up-counter is structured such that said system clock count is incremented by the system clock pulses and is reset to zero upon receiving a reset signal;

(iii) a state generator containing means for detecting an edge transition in an input signal within a predetermined range of system clock counts, and means for generate a data control signal, a reference clock control signal, and said reset signal when such edge transition in the input signal is detected within said predetermined range of system clock counts or when said system clock counts reaches a predetermined value; and (iv) a window and data generator for generating regenerated clock and data signals in response to said data control signal and said reference clock control signal received from said state generator; and (b) means for separating data signals from said regenerated clock and data signals;

(c) further wherein said state generator comprises:

(i) a first state means for moving said state generator from a first state to a second state upon the detection of a positive edge transition in said input signal;

(ii) a second state means for moving said state generator from said second state to a third state and issuing a positive reference clock control signal, when said positive edge transition is detected in said input signal;

(iii) a third state means for issuing a command to examine said system clock counts and moving said state generator from said third state to a fourth state, when said system clock count reaches a first predetermined value;

(iv) a fourth state means for:

(A) issuing a command to examine said system clock counts until said system clock count reaches a second predetermined value;

(B) moving said state generator from said fourth state to said second state and outputting a positive reset signal and a positive data control signal, when a positive edge transition is detected in said input signal;

(C) moving said state generator from said fourth state to a fifth state and outputting a positive reset signal and a positive data control signal, when said system clock count reaches said second predetermined value;

(v) a fifth state means for issuing a command to examine said system clock counts and moving said state generator from said fifth state to a sixth state, when said system clock count reaches a third predetermined value; and (vi) a sixth state means for:

(A) issuing a command to examine said system clock counts until said system clock count reaches a fourth predetermined value;

(B) moving said state generator from said sixth state to said second state and outputting a positive reset signal and a positive data control signal, when a positive edge transition is detected in said input signal;

(C) moving said state generator from said sixth state to a fifth state and outputing a positive reset signal and a positive data control signal, when said system clock count reaches said fourth predetermined value.

12. A floppy disk controller according to claim 11 wherein said state generator comprises:

(a) an edge detector means for detecting a positive edge transition in said input signal;

(b) an input edge signal generating means for generating an input edge signal when said positive edge transition is detected; and (c) a register for outputting a he state signal of said state generator.

13. A floppy disk controller according to claim 12 wherein said state generator further comprises a combination logic, which receives said input edge signal and said system clock count as inputs, and generates said data control signal and said reference clock signal as outputs.

14. A floppy disk controller according to claim 11 wherein:

(a) said system clock source has a frequency which is a first integer multiple of the frequency of said input signal;

(b) said first predetermined value is said first integer minus one minus a second integer; and (c) said second predetermined value is said first integer minus one plus said second integer.

15. A floppy disk controller according to claim 14 wherein:

(a) said third predetermined value is said first integer minus one minus twice of said second integer; and (b) said fourth predetermined value is said first integer minus one.

16. A floppy disk controller comprising:

(a) a digital data separator for reformatting input data signals received from a floppy disk, said input data signals containing data signals and clock signals arranged in alternating data/clock slots, said digital data separator comprising:

(i) a system clock source for providing system clock pulses;

(ii) an up-counter coupled to said system clock source for incrementing a system clock count, said up-counter is structured such that said system clock count is incremented by the system clock pulses and is reset to zero upon receiving a reset signal;

(iii) a state generator containing means for detecting an edge transition in an input signal within a predetermined range of system clock counts, and means for generate a data control signal, a reference clock control signal, and said reset signal when such edge transition in the input signal is detected within said predetermined range of system clock counts or when said system clock counts reaches a predetermined value; and (iv) a window and data generator for generating regenerated clock and data signals in response to said data control signal and said reference clock control signal received from said state generator; and (b) means for separating data signals from said regenerated clock and data signals;

(c) wherein said regenerated clock and data signals are encoded such that:

(i) when said regenerated clock signal is logically high, a presence of a regenerated data pulse indicates that a clock pulse is present in said regenerated data stream; and (ii) when said regenerated clock signal is logically low, a presence of a regenerated data pulse indicates that a data pulse is present in said regenerated data stream.

17. A method for separating data signals from clock signals wherein said data signals and said clock signals are encoded in alternating clock/data slots in an input data stream, said method comprises the process of operating a state generator which comprises the following steps:

(a) pulsing a system clock into said state generator;

(b) using an up-counter to increment a system clock count in accordance with said system clock pulses;

(c) moving said state generator from a first state to a second state when a positive edge transition is detected in said input data stream;

(d) moving said state generator from said second state to a third state and issuing a positive reference clock control signal, when said positive edge transition is detected in said input signal;

(e) issuing a command to examine said system clock counts and moving said state generator from said third state to a fourth state, when said system clock count reaches a first predetermined value;

(f) issuing a command to examine said system clock counts until said system clock count reaches a second predetermined value, then performing the following steps:

(i) moving said state generator from said fourth state to said second state and outputting a positive reset signal and a positive data control signal, when a positive edge transition is detected in said input signal, said positive reset signal causing said system clock count in said up-counter to be reset to zero, and said positive data control signal causes a window and data generator to toggle its reference data control signal;

(ii) moving said state generator from said fourth state to a fifth state and outputting a positive reset signal and a positive data control signal, when said system clock count reaches said second predetermined value;

(g) issuing a command to examine said system clock counts and moving said state generator from said fifth state to a sixth state, when said system clock count reaches a third predetermined value; and (h) issuing a command to examine said system clock counts until said system clock count reaches a fourth predetermined value; then performing the following steps:
(i) moving said state generator from said sixth state to said second state and outputing a positive reset signal and a positive data control signal, when a positive edge transition is detected in said input signal;
(ii) moving said state generator from said sixth state and outputing a positive reset signal and a positive data control signal, when said system clock count reaches said fourth predetermined value.

18. A method for separating data signals from clock signals according to claim 17 wherein:

(a) said system clock source has a frequency which is a first integer multiple of the frequency of said input signal;
(b) said first predetermined value is said first integer minus one minus a second integer;
(c) said second predetermined value is said first integer minus one plus said second integer;
(d) said third predetermined value is said first integer minus one minus twice of said second integer; and
(e) said fourth predetermined value is said first integer minus one.

* * * * *